United States Patent [19]

Sluys

[11] E Patent Number: Re. 31,984

[45] Reissued Date of Patent: Sep. 17, 1985

[54] CONCRETE MARINE FLOAT AND METHOD OF FABRICATING

[75] Inventor: Wesley W. Sluys, Bellingham, Wash.

[73] Assignee: Builders Concrete, Inc., Bellingham, Wash.

[21] Appl. No.: 491,937

[22] Filed: May 5, 1983

Related U.S. Patent Documents

Reissue of:

[64] Patent No.: 4,265,193
Issued: May 5, 1981
Appl. No.: 57,594
Filed: Jul. 16, 1979

[51] Int. Cl.[4] ..... B63B 35/44

[52] U.S. Cl. ..... 114/267; 114/266; 405/219

[58] Field of Search ..... 114/267, 266, 263, 65 A; 405/219

[56] References Cited

U.S. PATENT DOCUMENTS

| | | | |
|---|---|---|---|
| 3,091,203 | 5/1963 | Usab | 114/266 |
| 3,128,737 | 4/1964 | Usab | 114/266 |
| 3,799,093 | 3/1974 | Thomson | 114/266 |

*Primary Examiner*—Sherman D. Basinger
*Attorney, Agent, or Firm*—Seed and Berry

[57] ABSTRACT

A concrete float having a buoyant foam core surrounded by a concrete shell. The deck of the shell has integrally formed therewith a plurality of transverse ribs and longitudinal ribs which strengthen the deck. Consequently, the necessary strength for the deck can be achieved by utilizing a substantially reduced quantity of concrete. A tubular conduit extends beneath at least some of the transverse ribs. The conduits are provided in order to receive tie rods having their ends projecting from the sides of the float and through elongated wales which serve to secure the floats to each other. The concrete is preferably reinforced with conventional concrete reinforcing bars. The float is formed by placing a rectangular block of foam in a rectangular form after a layer of concrete has been poured in the form with the foam core being positioned apart from the sides of the form. Transverse and longitudinal grooves are formed in the upper surface of the core, and tubular conduits are placed in at least some of the transverse grooves. Finally, sufficient concrete is poured into the form to fill the sides and cover the upper surface of the foam thereby filling the space between the core and foam. The concrete also fills the grooves in the foam thereby creating the transverse and longitudinal ribs and securing the tubular conduits in position within the transverse grooves.

14 Claims, 5 Drawing Figures

FIG. 1
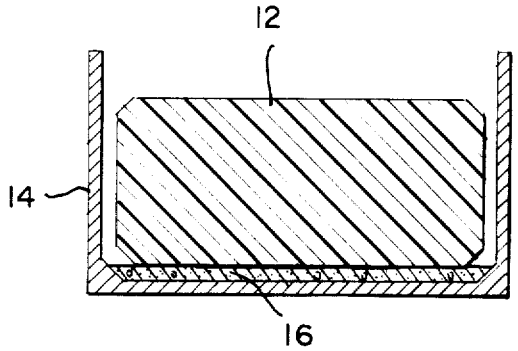
FIG. 2
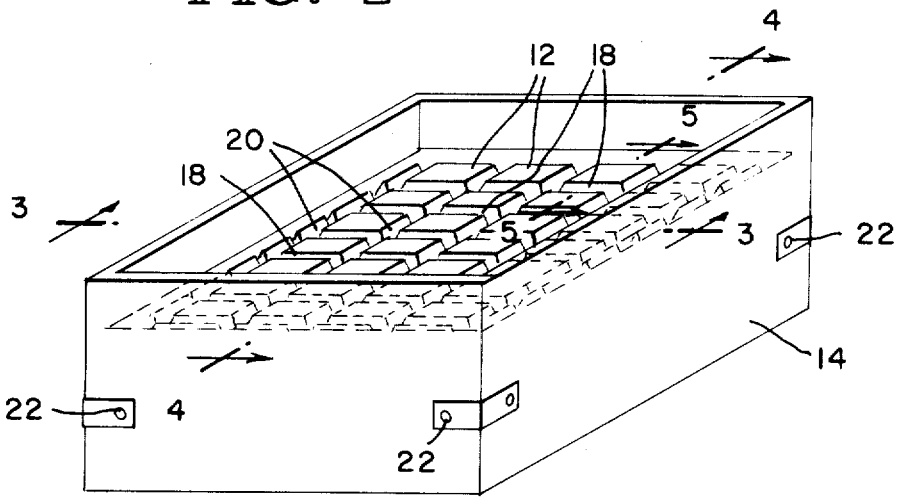
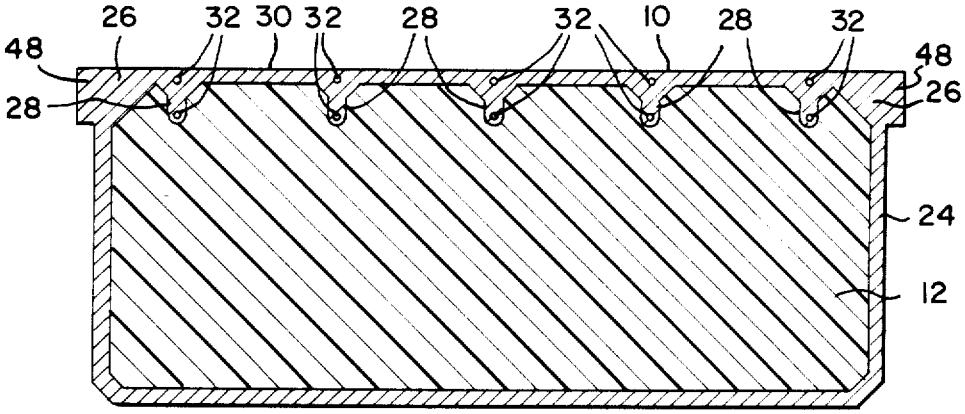
FIG. 3

CONCRETE MARINE FLOAT AND METHOD OF FABRICATING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to concrete marine floats, and more particularly, to a concrete marine float which maintains a high degree of strength while using a relatively little amount of standard, non energy intensive aggregate concrete.

2. Description of the Prior Art

Concrete floats composed of a concrete shell surrounding either a hollow or buoyant foam core have long been used in the construction of floating marine piers. These floats are generally of two different varieties. The first variety is formed with lightweight aggregate concrete utilizing thermally expanded shale in order to maximize the buoyancy of the float. The primary disadvantage of utilizing lightweight aggregate concrete is its relatively high expense. Lightweight expanded shale aggregate is normally manmade in a thermal reaction and its manufacture is extremely energy intensive. Thus, its cost has rapidly increased with the rapid increase in the cost of energy. It is conceivable that, with the possibility that fossil fuel based energy could become allocatable by end-use importance to national or regional goals, sufficient energy may not be available to the lightweight aggregate producing industry.

The second variety of concrete float utilizes naturally occurring, standard weight aggregate concrete which is substantially denser than expanded shale concrete but is much less expensive due to its lack of energy-related costs. Also, because the aggregate itself is denser, relatively less cement (another energy intensive product) need be used to achieve equivalent strength. In order to compensate for the added concrete weight while providing sufficient freeboard, the depth of the concrete float must be increased beyond the float depth or height required for floats constructed of expanded shale concrete. The additional depth further adds to the weight and displacement of the float thereby aggravating the need for additional buoyancy which is provided by an even deeper float. As a result, standard weight aggregate concrete floats are proportionately larger and heavier than expanded shale concrete floats and the freight cost of shipping them to job sites is commensurately greater.

Attempts have been made to solve the above described problems with standard weight aggregate concrete floats by reducing the weight of such floats, generally by reducing the thickness of the concrete shell. However, with no structural support under the deck, as with an open or hollow core float, decks must have a minimum thickness of two inches to support loads typically imposed on the decks as required by building codes. Attempts have been made to utilize foam cores to support the float deck in order to allow a deck having a thickness of less than two inches. However, the foam shrinks in size with the passage of time at a far greater rate than the concrete shrinkage so that a void is soon created between the upper surface of the foam and the lower surface of the concrete deck. Consequently, even with floats having a buoyant core, the deck must be at least two inches thick.

SUMMARY OF THE INVENTION

It is an object of the invention to provide a marine float which is relatively strong for the quantity of concrete used to form the float.

It is another object of the invention to provide a marine float which is fabricated with standard weight aggregate concrete yet is no heavier for its size nor greater in displacement than conventional floats fabricated with special lightweight aggregate concrete.

It is still another object of the invention to provide a concrete marine float which is secured to other floats by elongated wales which are fastened with tie rods extending transversely through the float in which the tie rods if desired may be inserted at the installation site.

It is a further object of the invention to provide a method of easily and inexpensively forming a concrete marine float as described above while conserving energy.

These and other objects of the invention are accomplished by a marine float formed by a concrete shell having a bottom, four sides and a deck. The deck includes a plurality of integrally formed, downwardly projecting transverse and longitudinal reinforcing ribs providing the necessary strength for the deck while allowing the deck to have a relatively thin mean thickness. Although the shell may be hollow, it preferably surrounds a buoyant foam core with the outer surface of the core conforming to the inner surface of the shell. A tubular conduit preferably extends from one side of the float to the other beneath at least some of the transverse ribs to provide a plurality of transverse passages through the float. At the installation site tie rods are inserted through the transverse passages and secured to elongated wales to fasten the floats to each other. In order to further strengthen the concrete, reinforcing bars are preferably cast into the concrete particularly along the deck. The float is formed by pouring a layer of concrete into a rectangular form in order to form the bottom of the float. A foam core having the shape of a rectangular prism is then placed in the rectangular form on top of the poured concrete floor with the sides of the core positioned apart from the sides of the form. The poured concrete floor serves to space the core from the bottom of the form. Transverse and longitudinal grooves are then formed in the upper surface of the core, and the concrete is poured into the form to fill the space between the core and the form and to cover the upper surface of the core thereby filling the grooves to form the transverse and longitudinal ribs. Alternatively, the grooves may be formed in the core after the concrete is poured around the sides and bottom of the core, but before the concrete is poured over the top of the core. Finally, the completed float is removed from the form. Where the float is to include a plurality of transverse passages, a tubular conduit having a length substantially equal to the transverse dimension of the form is placed in at least some of the transverse grooves before the concrete is poured over the upper surface of the core.

BRIEF DESCRIPTION OF THE DRAWINGS

FIG. 1 is a cross-sectional view of the float during its initial stages of fabrication.

FIG. 2 is an isometric view of the float during its later stages of manufacture just before the concrete is poured into the form.

FIG. 3 is a cross-sectional view taken along the line 3—3 of FIG. 2.

DETAILED DESCRIPTION OF THE INVENTION

Figure 4:
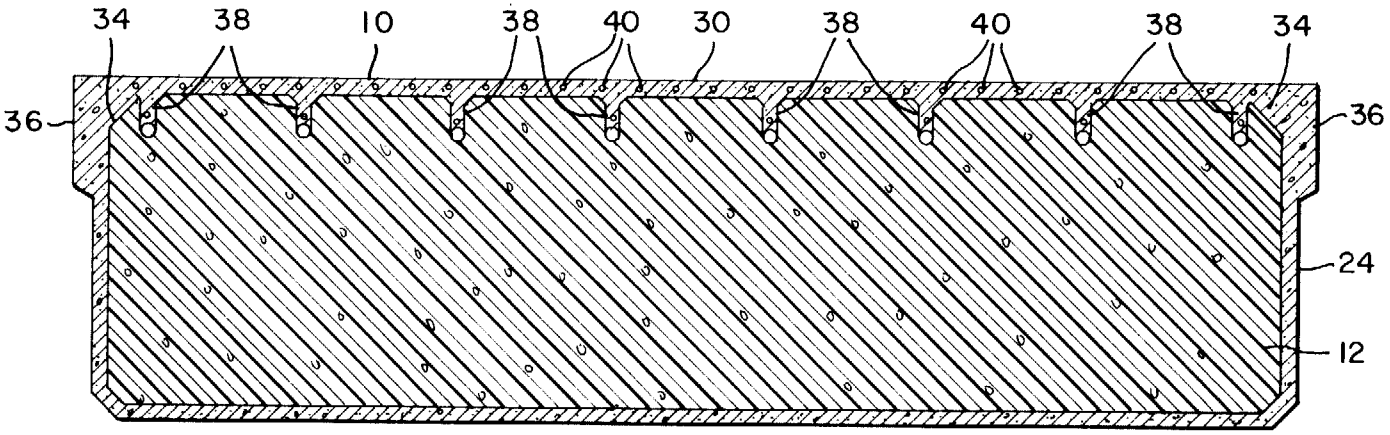
FIG. 4 is a cross-sectional view taken along the line 4—4 of FIG. 2.

The structure of the inventive concrete float can best be understood by explaining the manner in which it is fabricated. With reference to FIG. 1, a rectangular core 12 of buoyant foam such as polystyrene is placed in a rectangular form 14. The core 12 is supported on the floor of the form 14 by a layer of freshly cast concrete 16 in order to space the core 12 from the sides and bottom of the form 14. It will be noted that the sides of the form 14 extend upwardly above the upper surface of the core 12 to allow concrete to cover the upper surface of the core 12 as explained hereinafter. Although concrete may now be poured into the space between the core 12 and form 14 to a level several inches below the upper surface of the core 12, the concrete is preferably poured at a later stage as explained hereinafter.

As best illustrated in FIG. 2, a plurality of spaced apart transverse grooves 18 and longitudinal grooves 20 are then formed in the upper surface of the core 12. The depth of the grooves 18, 20 will determine the thickness of the reinforcing ribs, as explained hereinafter. Standard concrete reinforcing rods (not shown) may also be positioned above the core 12 at this time to improve the strength of the float. These reinforcing rods are not illustrated in FIG. 2 in the interests of clarity, but are illustrated in subsequent figures. Finally, the upper edges of the core 12 are beveled to provide a chamfered internal float structure, as explained in greater detail hereinafter.

As illustrated in FIG. 2, the sides of the form 14 are releasably secured to each other by fasteners 22 to allow the form 14 to be easily removed from the float.

After the foam core 12 has been prepared as explained with respect to FIG. 2, concrete is poured into the form 14 so that it fills the space between the core 12 and form 14 and completely covers the core 12 allowing the grooves 18, 20 to be filled with concrete. Transverse passages are preferably formed in the float by placing a tubular conduit in at least some of the transverse grooves 18 before the concrete is poured into the form 14. After the concrete has solidified, the sides of the form 14 are removed from the float by releasing the fasteners 22 thereby allowing the float 10 to be lifted from the bottom of the form.

A transverse cross-section of the resulting float 10 is illustrated in FIG. 3. Note that the concrete shell 24 conforms exactly to the outer surface of the core 12. Consequently, the edges of the float are chamfered at 26 and a plurality of longitudinal reinforcing ribs 28 project downwardly from the upper surface of deck 30. A pair of reinforcing bars 32 preferably extend along each reinforcing rib 28 to further increase the strength of the deck 30. The bars 32 would, of course, be placed in position before the concrete is poured onto the core 12.

Figure 5:
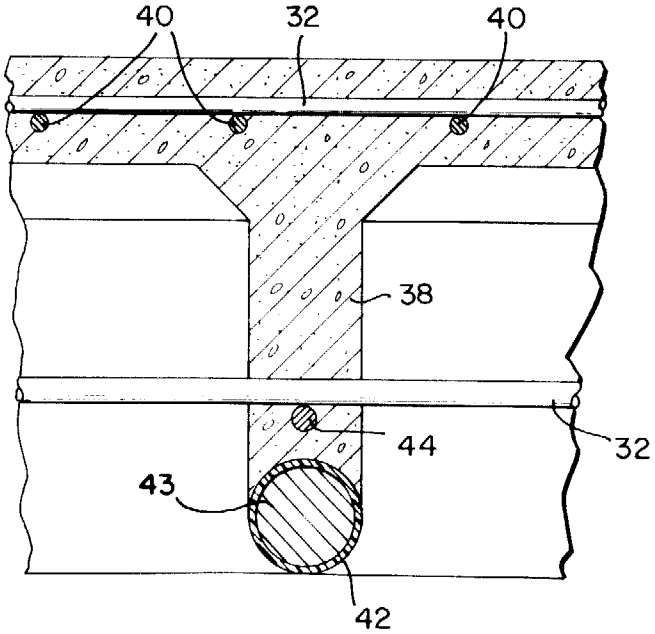
FIG. 5 is a detailed cross-sectional view taken along the line 5—5 of FIG. 2.

A longitudinal cross-sectional view of the float 10 is illustrated in FIG. 4. The transverse edges of the float 10 are chamfered at 34 in the same manner as the longitudinal edges at 26 (FIG. 3). Additionally, the upper portion of the transverse sides are thickened at 36 since it is these portions which abut adjacent floats. The concrete placed in the transverse grooves 18 form a plurality of transverse ribs 38 illustrated in greater detail in FIG. 5. It will also be noted that a plurality of spaced apart reinforcing rods 40 are embedded in the deck 30. The transverse reinforcing ribs 38, as best illustrated in FIG. 5, terminate in a tubular conduit 42 which is preferably a length of polyvinyl chloride tubing. The length of the conduit 42 is substantially equal to the inside transverse dimension of the form 14 so that the conduit 42 extends across the entire width of the float 10. A transverse reinforcing rod 44 is placed in the rib 38 above the conduit 42.

The reinforcing ribs 28, 38 provide a strength which is equivalent to a solid deck having a uniform thickness requiring substantially more concrete than the inventive deck 30. Consequently, the weight, and hence transportation cost, of the float 10 is less than conventional floats manufactured with standard weight aggregate concrete. Also, the reduced weight of the float 10 allows the height of the float 10 to be approximately equal to the height of a conventional float utilizing special lightweight aggregate concrete without sacrificing freeboard.

In use the floats are transported to an installation site. Elongated tie rods 43 (FIG. 5) are then inserted through the conduits 42. The floats 10 are then arranged end-to-end with the thickened portions 36 abutting each other. Finally, elongated wales 48 acting as fastening members are positioned along the sides of the floats 10 and secured by means of the tie rods 43.

I claim:

[1. A marine float, comprising a concrete shell having a bottom, a deck, two opposed sidewalls having lower edges contacting opposite side edges of said bottom and upper edges contacting opposite side edges of said deck and two opposed endwalls having lower edges contacting respective end edges of said bottom, upper edges contacting respective end edges of said deck, and opposed side edges contacting opposite side edges of said sidewalls, said floats being adapted for joining other of said floats endwall-to-endwall, said deck having a plurality of downwardly projecting transverse and longitudinal reinforcing ribs integrally formed therewith, thereby allowing said deck to have a relatively thin mean thickness, said float further including a tubular conduit extending transversely beneath each transverse rib in contact with the lower edge thereof, and a tie rod extending through each of said conduits with the ends of said tie rods projecting from the sidewalls of said float to allow said tie rods to be secured to fastening members which fasten said floats to each other.]

2. The marine float of claim [1] 7 wherein said shell surrounds a buoyant foam core with the outer surface of said core conforming to the inner surface of said shell.

3. The marine float of claim [1] 7 further including a plurality of reinforcing bars extending into said shell.

4. A method of fabricating a marine float, comprising:

pouring a layer of concrete into a form having the shape of a rectangular prism such that said concrete covers the bottom of said form;

placing a core of buoyant foam having the shape of a rectangular prism on said poured layer of concrete with the sides of said core positioned apart from the sides of said form by a predetermined distance;

forming a plurality of transverse [and longitudinal] grooves *and at least one longitudinal groove* in the upper surface of said core;

placing a tubular conduit [having a length substantially equal to the inner transverse dimension of said form] in at least some of said transverse grooves before said concrete is poured over the upper surface of said core;

pouring concrete into said form such that said concrete fills the space between said core and said form, and said concrete covers the upper surface of said core, thereby filling said grooves; and removing said concrete and core from said form.

5. The method of claim 4 further including the step of placing reinforcing bars above said core prior to pouring concrete into said form in order to imbed said bars in said concrete.

6. The method of claim 4 further including the step of placing a reinforcing bar in at least some of said grooves prior to pouring concrete into said form, thereby imbedding said bars in reinforcing ribs formed by said grooves.

*7. A marine float, comprising a concrete shell having a bottom, a deck, two opposed sidewalls having lower edges contacting opposite side edges of said bottom and upper edges contacting opposite side edges of said deck and two opposed end walls having lower edges contacting respective end edges of said bottom, upper edges contacting respective end edges of said deck, and opposed side edges contacting opposite side edges of said sidewalls, said float being adapted for joining other of said floats end wall-to-end wall, said deck having a plurality of downwardly projecting transverse reinforcing ribs and at least one downwardly projecting, longitudinal reinforcing rib integrally formed therewith, thereby allowing said deck to have a relatively thin mean thickness, said float further including a plurality of tie rods extending transversely ccross the float, each tie rod adjacent a transverse reinforcing rib with the ends of said tie rods projecting from the sidewalls of said float to allow said tie rods to be secured to fastening members which fasten said floats to each other, and a tubular conduit surrounding each of said tie rods, each conduit being positioned adjacent the lower edge of a transverse reinforcing rib.*

*8. The method of claim 4 wherein the tubular conduit is of a length substantially equal to the inner transverse dimension of said form, said step of pouring concrete into said form including pouring the concrete into the form along the full length of the tubular conduit and across the entire length of the inner transverse dimension of said form.*

*9. A marine float, comprising a concrete shell having a bottom, a deck, two opposed sidewalls having lower edges contacting opposite side edges of said bottom and upper edges contacting opposite side edges of said deck and two opposed endwalls having lower edges contacting respective end edges of said bottom, upper edges contacting respective end edges of said deck, and opposed side edges contacting opposite side edges of said sidewalls, said float being adapted for joining other of said floats endwall-to-endwall, said deck having a plurality of downwardly projecting transverse and longitudinal reinforcing ribs integrally formed therewith, thereby allowing said deck to have a relatively thin mean thickness, said float further including a tubular conduit extending transversely beneath each transverse rib in contact with the lower edge thereof, and a tie rod extending through each of said conduits with the ends of said tie rods projecting from the sidewalls of said float to allow said tie rods to be secured to fastening members which fasten said floats to each other.*

*10. The marine float of claim 9 wherein said shell surrounds a buoyant foam core with the outer surface of said core conforming to the inner surface of said shell.*

*11. The marine float of claim 9 further including a plurality of reinforcing bars extending into said shell.*

*12. A method of fabricating a marine float, comprising:*

*pouring a layer of concrete into a form having the shape of a rectangular prism such that said concrete covers the bottomm of said form;*

*placing a core of buoyant foam having the shape of a rectangular prism on said poured layer of concrete with the sides of said core positioned apart from the sides of said form by a predetermined distance;*

*forming a plurality of transverse and longitudinal grooves in the upper surface of said core;*

*placing a tubular conduit having a length substantially equal to the inner transverse dimension of said form in at least some of said transverse grooves before said concrete is poured over the upper surface of said core;*

*pouring concrete into said form such that said concrete fills the space between said core and said form, and said concrete covers the upper surface of said core, thereby filling said grooves; and*

*removing said concrete and core from said form.*

*13. The method of claim 12 further including the step of placing reinforcing bars above said core prior to pouring concrete into said form in order to imbed said bars in said concrete.*

*14. The method of claim 12 further including the step of placing a reinforcing bar in at least some of said grooves prior to pouring concrete into said form, thereby imbedding said bars in reinforcing ribs formed by said grooves.*

* * * * *